US008166400B2

(12) United States Patent
Todd (10) Patent No.: US 8,166,400 B2
(45) Date of Patent: Apr. 24, 2012

(54) NOTIFYING BLIND USERS OF LIVE REGION UPDATES

(75) Inventor: David Lee Todd, Winston Salem, NC (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 12/420,240

(22) Filed: Apr. 8, 2009

(65) Prior Publication Data

US 2010/0262914 A1    Oct. 14, 2010

(51) Int. Cl.
*G06F 3/00* (2006.01)
(52) U.S. Cl. .......................... 715/729; 715/865
(58) Field of Classification Search .................. 715/865, 715/729
See application file for complete search history.

(56) References Cited

U.S. PATENT DOCUMENTS

| 5,287,102 | A  | * | 2/1994  | McKiel, Jr. ............... 340/4.14 |
| 6,334,157 | B1 | * | 12/2001 | Oppermann et al. ......... 719/310 |
| 6,856,333 | B2 | * | 2/2005  | Ullmann et al. ............. 715/865 |
| 7,673,241 | B2 | * | 3/2010  | Sun et al. ..................... 715/729 |
| 2003/0164848 | A1 | * | 9/2003 | Dutta et al. .................. 345/729 |
| 2005/0034063 | A1 |   | 2/2005 | Baker et al. |
| 2005/0168436 | A1 |   | 8/2005 | Parzygnat et al. |
| 2007/0055938 | A1 | * | 3/2007 | Herring et al. ................ 715/729 |

OTHER PUBLICATIONS

Thiessen et al., "Ajax Live Regions: Chat as a Case Example", International World Wide Web Conference, Technical Paper, pp. 1-8, Banff, Canada, May 7-8, 2007.
Lemon et al., "Making Ajax Work with Screen Readers", pp. 1-18, retrieved Jun. 26, 2008 http://juicystudio.com/article/making-ajax-work-with-screen-readers.php.
"AJAX response from Freedom Scientific", Apr. 27, 2007, The Desert Skies (blog) http://jeffbishop.com/the-desert-skies/ajax-response-from-freedom-scientific/.

* cited by examiner

*Primary Examiner* — Dennis Bonshoc
(74) *Attorney, Agent, or Firm* — Yee & Associates, P.C.; Libby Z. Toub (57) ABSTRACT

A method, apparatus, and computer program product are present for generating audio cues. New content is requested for a live region in a number of live regions displayed on a display device from a server. In response to receiving the new content for the live region in the number of live regions in the webpage, the live region in the number of live regions in the webpage is updated to form an updated live region displayed on the display device. An audio cue is generated on a sound generation device. The audio cue identifies the live region in the number of live regions in the webpage for which the new content has been received.

18 Claims, 6 Drawing Sheets

```
<h1>Weather</h1>  /— 900
<h1>Sports</h1>  /— 902
<h1>Stock market summary</h1>  ~— 904
```

FIG. 9

```
1000
  \
<APPLET name="soundApplet" code="com.ibm.able.Sound.class" width=" 0 "
height=" 0 ">
```

FIG. 10

```
                                                    1100
public void playSound (String soundFile)  {       /
    try  {
        java.applet.AudioClip clip;
        clip = getAudioClip(getDocumentBase( ), soundFile);  /— 1102
        clip.play( );  ~— 1104
    } catch (Exception e)  {
        e.printStackTrace( );
    }
}
```

FIG. 11

```
function ajaxRequest (soundFile) {
    .
    .
    ajaxRequestObj.onreadystatechange =
        function () { updateLiveRegion (soundfile) ; }
    .
```

FIG. 12

```
<input type="button" name="submitButton" id="submitButton"
value="Click to update the weather" onkeypress="ajaxRequest ( 'reg1.au' ) "
/>
```

FIG. 13

```
function updateLiveRegion(soundFile) {
    if (ajaxRequestObj.readyState == 4) {
        if (ajaxRequestObj.status == 200) {
            .
            .
            document.soundApplet.playSound(soundFile) ;
        }
    }
}
```

FIG. 14

NOTIFYING BLIND USERS OF LIVE REGION UPDATES

BACKGROUND OF THE INVENTION

1. Field of the Invention

The present invention relates generally to an improved data processing system and more specifically, to a method and apparatus for processing data. Still more particularly, the present disclosure relates to a computer implemented method, apparatus, and computer program product for generating audio cues in response to updates to regions in a webpage.

2. Description of the Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses use Internet sites as an integral part of their marketing efforts to inform consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Further, the Internet is becoming increasingly popular as a medium for commercial transactions.

Currently, the most commonly employed method of transferring data over the Internet is to employ the World Wide Web environment, also called simply "the Web". In the Web environment, servers and clients effect data transaction using the Hypertext Transfer Protocol (HTTP), a known protocol for handling the transfer of various data files. Examples of these types of data files include text, still graphic images, audio, and motion video. The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL).

A uniform resource locator is a special syntax identifier defining a communications path to specific information. Each logical block of information accessible to a client, called a "page" or a "Webpage", is identified by a uniform resource locator. The universal resource locator provides a universal, consistent method for finding and accessing this information, not necessarily for the user, but mostly for the user's Web "browser". A browser is a program capable of submitting a request for information identified by an identifier, such as, for example, a uniform resource locator.

With respect to presenting content through webpages, AJAX is often used for creating interactive web applications. AJAX is a group of interrelated web development techniques that may be used to create interactive web applications. With AJAX, web applications can retrieve data from servers in an asynchronous manner in the background without interfering with the display and behavior of the existing webpage that is being presented on a display device.

Areas of a webpage that may be updated asynchronously while a webpage is being presented are referred to as live regions. In other words, a live region in a webpage may be updated without requiring refreshing or reloading of the webpage.

BRIEF SUMMARY OF THE INVENTION

According to one embodiment of the present invention, a method is present for generating audio cues. New content is requested for a live region in a number of live regions displayed on a display device from a server. In response to receiving the new content for the live region in the number of live regions in the webpage, the live region in the number of live regions in the webpage is updated to form an updated live region displayed on the display device. An audio cue is generated on a sound generation device. The audio cue identifies the live region in the number of live regions in the webpage for which the new content has been received.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
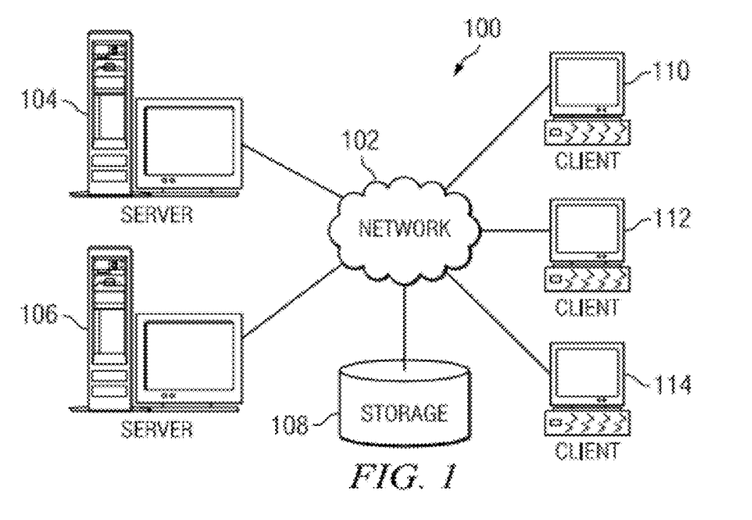
FIG. 1 is a pictorial representation of a network of data processing systems in which illustrative embodiments may be implemented.
Figure 2:
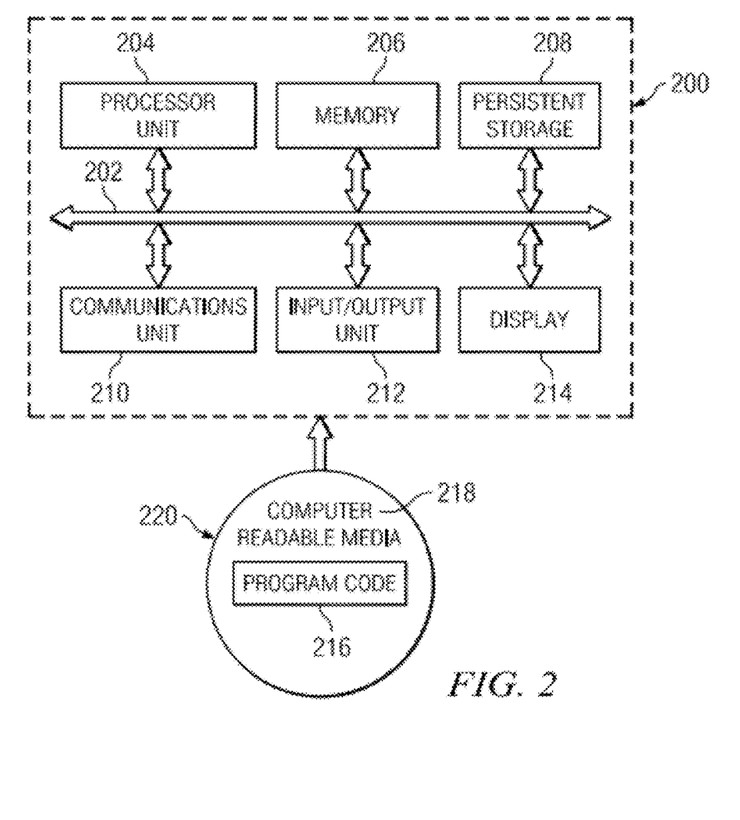
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include inorganic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The different illustrative embodiments recognize and take into account that in the use of processes that allow for live regions in a webpage, challenges may be present for visually impaired users. For example, visually impaired users may employ a screen reader that audibly presents the contents of a webpage over a sound generation device. The different illustrative embodiments recognize and take into account that many currently available screen readers do not read live regions of a webpage when content for live regions are updated. As a result, the different illustrative embodiments recognize and take into account that visually impaired users do not have a way to know when new content has been presented in a live region. For example, a visually impaired user may not be able to notice updates to a live region.

Thus, the different illustrative embodiments provide a computer implemented method, apparatus, and computer program code for generating audio cues. New content is requested for a live region in a number of live regions in a webpage displayed on a display device from a server. A number of items, as used herein, refers to one or more items. For example, a number of live regions refers to one or more live regions. In response to receiving the new content for the live region in the number of live regions in the webpage, the live region is updated to form an updated live region displayed on the display device. An audio cue is generated on a sound generation device in which the audio cue identifies the live region in the number of live regions in the webpage for which the new content has been received. In other words, the audio cue also may indicate to the user which live region was updated.

Figure 3:
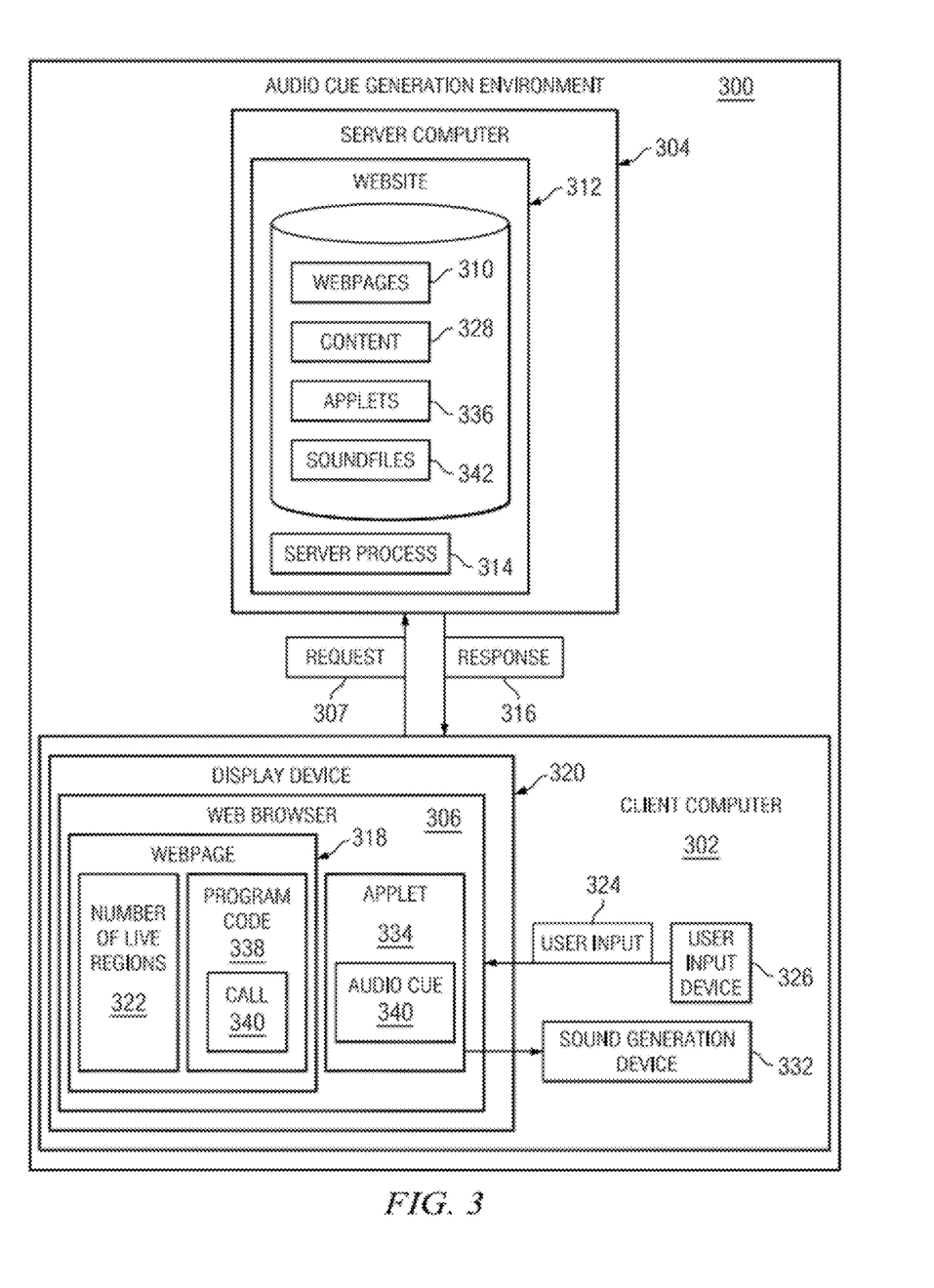
FIG. 3 is a diagram of a audio cue generation environment in accordance with an illustrative embodiment.

With reference now to FIG. 3, a diagram of an audio cue generation environment is depicted in accordance with an illustrative embodiment. Audio cue generation environment 300 may be implemented in network data processing system 100 in FIG. 1 using one or more clients and/or servers.

In this illustrative example, audio cue generation environment 300 may include client computer 302 and server computer 304. Web browser 306 may execute on client computer 302. Web browser 306 may generate request 307 for a webpage within webpages 310 on website 312. In these illustrative examples, server process 314 handles request 307 and may generate response 316. Response 316 may contain webpage 318 from webpages 310. In this example, response 316 may be used to present webpage 318 in web browser 306.

This presentation is made on display device 320. In this illustrative example, webpage 318 has number of live regions 322. A user may generate user input 324 through user input device 326 to update one or more live regions 322. This update may be sent in the form of a request, such as request 307, to server process 314. In response to receiving this type of request, server process 314 may identify content 328 to return response 316. Content 328 may then be used to update number of live regions 322 on webpage 318. This update may be made asynchronously, while webpage 318 is being displayed. In other words, number of live regions 322 may be updated using content 328 without refreshing or reloading webpage 318.

The different illustrative embodiments provide a capability to generate audio cue 330 at sound generation device 332 in response to an update of a number of live regions 322 in webpage 318. Audio cue 330 is generated in a manner to identify the live region in which the update occurred. In other words, audio cue 330 may indicate which live region was updated as well as indicate that an update has occurred to a live region. In these examples, audio cue 330 may be generated by applet 334 executing in conjunction with web browser 306. Applet 334 is an example of an applet from applets 336 on web site 312 that may be downloaded by server process 314 to web browser 306.

The generation of audio cue 330 may be initiated by program code 338 located within webpage 318. Program code 338 may take the form of a script such as, for example, without limitation, JavaScript. Program code 338 detects the generation of request 307 for updates to number of live regions 322. When response 316 is returned containing content 328 for updating a number of live regions 322, program code 338 generates call 340 to applet 334 to generate audio cue 330. Call 340 contains an identification of a sound file from soundfiles 342 in website 312. Applet 334 retrieves an appropriate sound file from soundfiles 342 to generate audio cue 330.

In this manner, a user may be alerted to the occurrence of an update of a live region within number of live regions 322. Audio cue 330 also identifies which live region within number of live regions 322 has been updated. For example, if number of live regions 322 includes a weather region, a sports region, and a stock market summary region, an update to the weather region may be presented with an audio cue "the weather has been updated".

Figure 4:
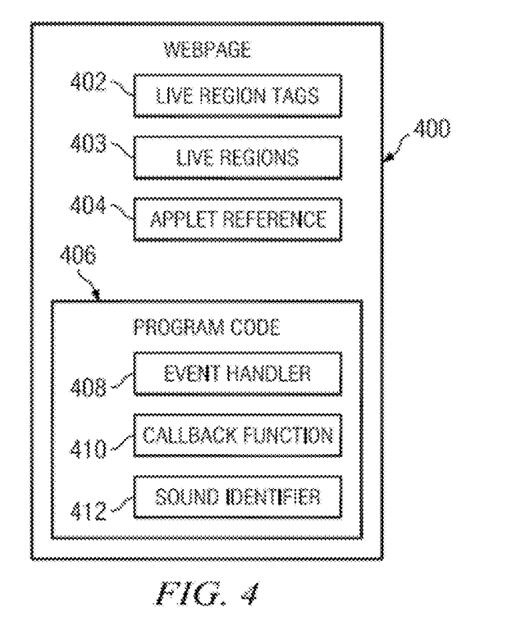
FIG. 4 is a diagram of a webpage in accordance with an illustrative embodiment.

With reference now to FIG. 4, a diagram of a webpage is depicted in accordance with an illustrative embodiment. Webpage 400 is an example of one implementation of webpage 318 in FIG. 3. Webpage 400 is capable of generating audio cues in response to updates to live regions, such as live regions 403. In this example, webpage 400 includes live region tags 402, applet reference 404, and program code 406. Live region tags 402 may be used to identify each region in webpage 400 with a unique heading. In these examples, tags 402 are hypertext markup language tags (HTML). Of course, any type of tag may be used, depending on the implementation. Each of live regions 403 are identified with live region tags 402 and may be associated with a sound file which may be stored on the server. Event handler 408 provides an identification and/or pointer to a soundfiles 342. When event handler 408 is activated, program code 406 sends identification and/or a pointer to applet 404. Applet 404 retrieves the identified sound file from soundfiles 342 and generates an audio cue.

Program code 406, in these examples, includes event handler 408 and callback function 410. Event handler 408 may monitor for events that generate requests within live regions 403 identified by live region tags 402. In response to detecting an event, event handler 408 generates a request for new content to update a live region within live regions 403. The request for new content is sent to the server. When new content is received, event handler 408 may call callback function 410 to update the particular live region with live regions 403. Additionally, callback function 410 also calls the applet identified by applet reference 404 to play a sound file for the particular live region. Event handler 408 may send the call to callback function 410 with sound identifier 412. Sound identifier 412 is a sound identifier that identifies a particular live region for which an update is received.

The illustrations of audio cue environment 300 in FIG. 3 and webpage 400 in FIG. 4 are not meant to imply physical or architectural limitations in the manner in which different environments and webpages may be implemented. Other components in addition to or in place of the ones illustrated may be used depending on the particular implementation. Further, in some illustrative embodiments, some components may be unnecessary.

In these illustrative examples, program code 406 may be implemented using JavaScript. Of course, other types of programming code or scripts may be used depending on the particular implementation. As another example, the applets in these examples take the form of Java applets. Of course, applets using other types of languages also may be implemented depending on the particular implementation. In these examples, an applet is a software component that runs in the context of another program such as a web browser. An applet may perform a narrow function that has no independent use in these examples.

Figure 5:
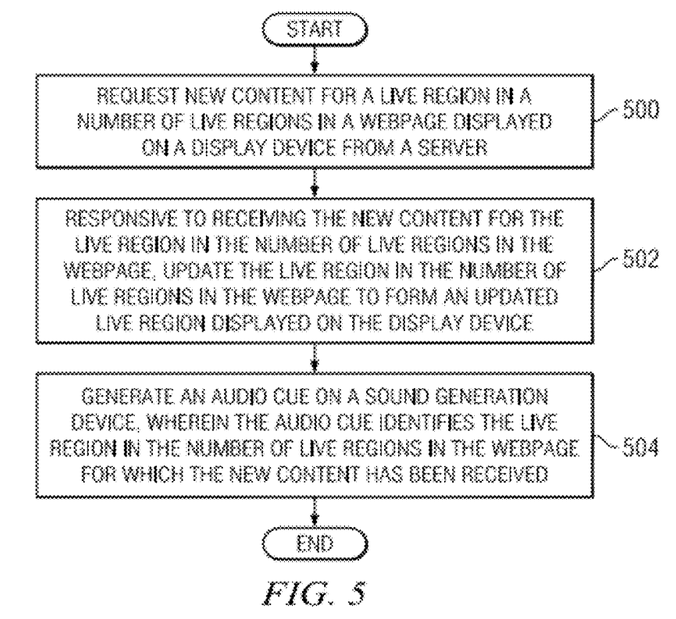
FIG. 5 is a flowchart of a process for generating audio cues in accordance with an illustrative embodiment.

With reference now to FIG. 5, a flowchart of a process for generating audio cues is depicted in accordance with an illustrative embodiment. The process illustrated in FIG. 5 may be implemented in an environment such as audio cue environment 300 in FIG. 3. In these examples, the process may be implemented in program code for a webpage such as, for example, program code 338 in FIG. 3 and/or program code 406 in FIG. 4.

The process begins by requesting new content for a live region in a number of live regions in a webpage displayed on a display device from a server (step 500). In response to receiving new content in the live region, the live region is updated in a webpage (step 502). The process then generates an audio cue on a sound generation device, in which the audio cue identifies the live region in the number of live regions in the webpage for which the new content has been received (step 504), with the process terminating thereafter.

Figure 6:
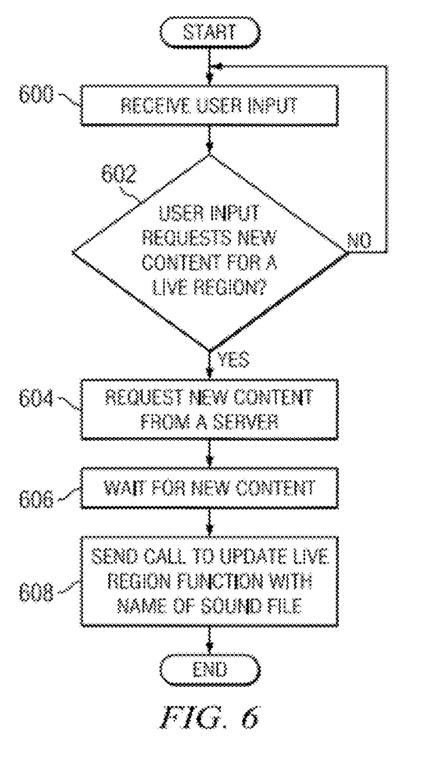
FIG. 6 is a flowchart of a process for generating an audio cue in accordance with an illustrative embodiment.

With reference now to FIG. 6, a flowchart of a process for generating an audio cue is depicted in accordance with an illustrative embodiment. The process illustrated in FIG. 6 may be implemented in program code such as, for example, program code 338 in FIG. 3 and/or program code 406 in FIG. 4. In particular, the steps illustrated in this figure may be implemented in an event handler such as, for example, event handler 408 in FIG. 4.

The process begins by receiving user input (step 600). The user input may be, for example, an action such as the selection of a button to request an update or new content for a particular live region. This input also may be, for example, without limitation, any other user input that indirectly results in a request for updated information and the activation of an event handler associated with a particular live region. A determination is made as to whether the user input requests new content for a live region (step 602). If the user input does request new content for the live region, the process requests the new content from the server (step 604). The process then waits for the new content (step 606). When the new content is received, a call is sent to an update live region function with the name of the sound file for the live region as a parameter (step 608), with the process terminating thereafter. With reference again to step 602, if the user input does not request new content for a live region, the process returns to step 600 to receive another user input.

Figure 7:
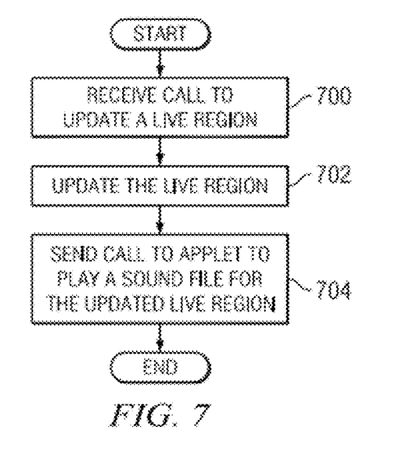
FIG. 7 is a flowchart of a process for updating a live region in accordance with an illustrative embodiment.

With reference now to FIG. 7, a flowchart of a process for updating a live region is depicted in accordance with an illustrative embodiment. The process illustrated in FIG. 7 may be implemented in a software component such as, for example, callback function 410 in FIG. 4.

The process begins by receiving a call to update a live region (step 700). In response to receiving this call, the live region may be updated with the content received from the server (step 702). The process may then send a call to an applet to play a sound file for the updated live region (step 704). This call may include the name or identification of the sound file. The identification of the sound file may be, for example, a name of the sound file, a pointer to the sound file, and/or some other suitable identification.

Figure 8:
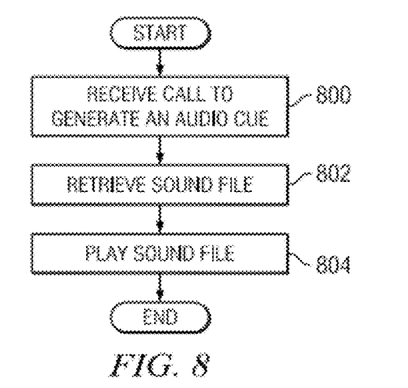
FIG. 8 is a flowchart of a process for generating an audio cue in accordance with an illustrative embodiment.

With reference to FIG. 8, a flowchart of a process for generating an audio cue is depicted in accordance with an illustrative embodiment. The process illustrated in FIG. 8 may be implemented in a software component such as, for example, applet 334 in FIG. 3.

The process begins by receiving a call to generate an audio cue (step 800). This call may include an identification of the sound file in which the audio cue is to be generated. The process then retrieves the sound file (step 802). The sound file may be retrieved from a server such as a server containing the website from which the webpage has been obtained. Step 802 also may include a locale for the user. Based on the locale, a different sound file may be retrieved. For example, the sound file may be presented using different languages based on different locales. The process then plays the sound file (step 804), with the process terminating thereafter.

Figure 9:
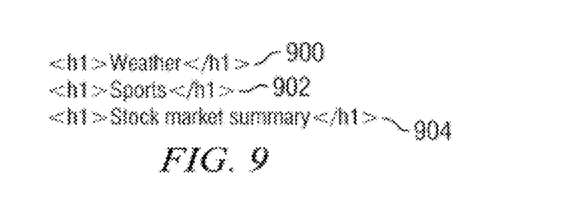
FIG. 9 is a diagram illustrating live region tags in accordance with an illustrative embodiment.

With reference now to FIG. 9, a diagram illustrating tags is depicted in accordance with an illustrative embodiment. In this example, tags 900, 902, and 904 are examples of live region tags 402 in FIG. 4. These tags may be used to identify different live regions for use in creating sound files. Tags 900, 902, and 904 may be rendered as headings in proximity to their respective live regions as live region labels. These tags take the form of hypertext markup language (HTML) tags in these illustrative examples. The headings allow low vision users to easily locate a live region that receives new information. Each sound file may have the name of one of the live regions as well as other information that a user may wish to hear when a live region is updated. For example, a weather sound file for tag 900 may be "the weather has been updated".

Figure 10:
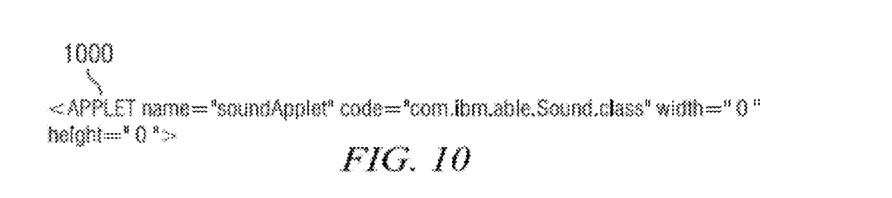
FIG. 10 is a diagram illustrating an example of an applet reference in accordance with an illustrative embodiment.

With reference now to FIG. 10, a diagram illustrating an example of an applet reference is depicted in accordance with an illustrative embodiment. In this example, reference 1000 is an example of an applet reference within applet references 404 in FIG. 4.

Figure 11:
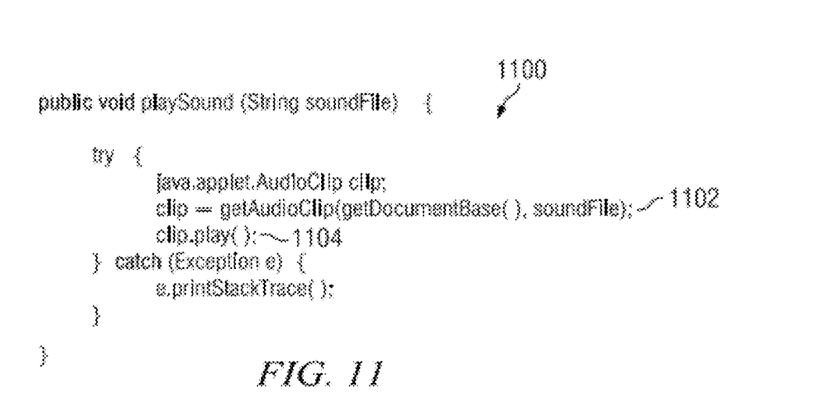
FIG. 11 is a diagram illustrating a method for an applet to generate an audio cue in accordance with an illustrative embodiment.

In FIG. 11, a diagram illustrating a method for an applet to generate an audio cue is depicted in accordance with an illustrative embodiment. In this example, method 1100 is an example of a method implemented in Java to retrieve a sound file from a web server and play the sound. Line 1102 is used to retrieve the sound file and line 1104 is used to play the sound file in this example.

Figure 12:
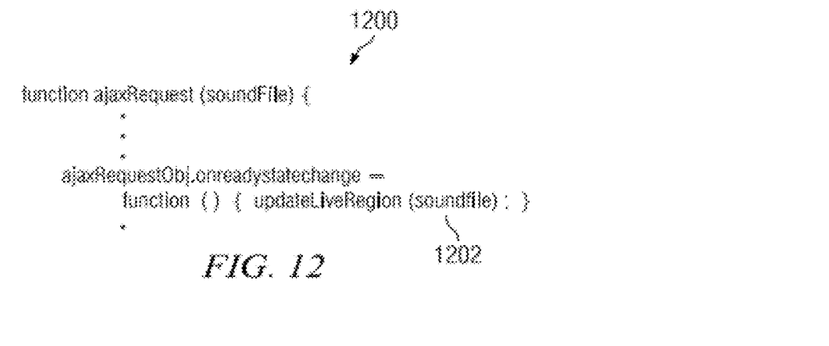
FIG. 12 is a diagram illustrating an example of an event handler registering a callback function in accordance with an illustrative embodiment.

Turning next to FIG. 12, a diagram illustrating an example of an event handler registering a callback function is depicted in accordance with an illustrative embodiment. In this example, event handler 1200 is an example of an event handler such as, for example, event handler 408 in FIG. 4. Event handler 1200 may be used to register a callback function that contains a sound file parameter, as illustrated in line 1202.

Figure 13:
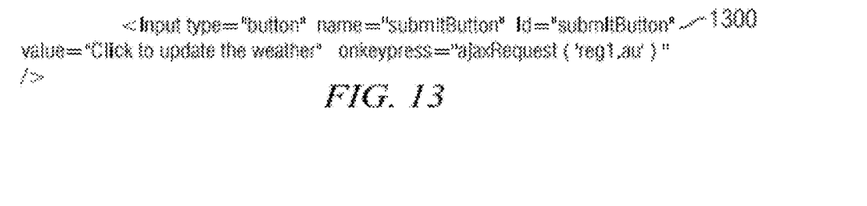
FIG. 13 is a diagram illustrating a control for initiating an event is depicted in accordance with an illustrative embodiment.

With reference next to FIG. 13, a diagram illustrating a control for initiating an event is depicted in accordance with an illustrative embodiment. In this example, line 1300 is an example of a line in a webpage that may render a button and invoke an update function.

Figure 14:
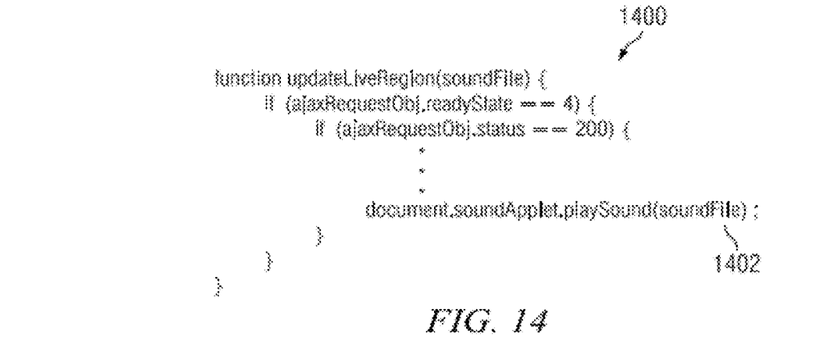
FIG. 14 is a diagram illustrating a callback function in accordance with an illustrative embodiment.

Turning now to FIG. 14, a diagram illustrating a callback function is depicted in accordance with an illustrative embodiment. In this example, callback function 1400 is an example of one implementation of callback function 410 in FIG. 4. Callback function 1400 is invoked when a server responds to a request for new content. Callback function 1400 updates the live regions. In this example, line 1402 of callback function 1400 initiates a call to an applet to play a sound file to identify the live region that has been updated.

Thus, one or more of the different illustrative embodiments provide a computer implemented method, apparatus, and computer program code for generating audio cues. The audio cues may be generated in a manner that identifies the live region that has been changed. With one or more of the illustrative embodiments, a user may be able to identify a live region that has been updated without having to view the live region. This type of feature may be useful to visually impaired users that do not use screen readers (e.g., low vision users) and screen reader users using a reader that does not support WAI-ARIA live regions.

Additionally, the different illustrative embodiments may be useful to users with cognitive disabilities that prevent them from visually determining that a live region contains new information. With the identification that the particular live region has been updated, the user may then direct a screen reader program to the live region that has been undated to hear the new content. A person with low vision or a cognitive disability may be notified that a particular live region contains new information using one or more of the illustrative embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for generating audio cues, the method comprising the steps of:

requesting, by a computer, new content for a live region in a number of live regions in a webpage displayed on a display device from a server;

responsive to the computer receiving the new content for the live region in the number of live regions in the webpage, updating, by the computer, the live region in the number of live regions in the webpage to form an updated live region displayed on the display device;

receiving, by the computer, an identification of a sound file associated with the updated live region in the number of live regions in the webpage and a locale of a user;

retrieving, by the computer, the sound file associated with the updated live region in the number of live regions in the webpage from the server based on the identification of the sound file and the locale of the user, wherein the sound file is presented in different languages based on different user locales; and generating, by the computer, an audio cue using the sound file in a language associated with the locale of the user on a sound generation device, wherein the audio cue identifies the updated live region in the number of live regions in the webpage for which the new content has been received.

2. The method of claim 1, wherein the requesting step comprises:
 receiving, by the computer, a user input through an input device to update the live region in the number of live regions in the webpage; and
 responsive to the computer receiving the user input, requesting, by the computer, the new content for the live region in the number of live regions in the webpage displayed on the display device from the server.

3. The method of claim 1 further comprising the steps of:
 invoking, by the computer, an event handler function capable of calling an applet to generate the audio cue that identifies the updated live region in the number of live regions in the webpage for which the new content has been received.

4. The method of claim 3, wherein the event handler function calls the applet using a call back function.

5. The method of claim 1, wherein the generating step is initiated in response to the computer updating the live region in the number of live regions with the new content.

6. The method of claim 1, wherein the number of live regions in the webpage is a plurality of live regions, and wherein the live region is a particular live region within the plurality of live regions being updated in the webpage.

7. The method of claim 6, wherein the particular live region within the plurality of live regions in the webpage is identified by hypertext markup language tags associated with the particular live region.

8. The method of claim 6, wherein the plurality of live regions in the webpage include a weather live region, a sports live region, and a stock market live region.

9. A computer for generating audio cues, the computer comprising:
 a bus;
 a communications unit connected to the bus;
 a storage device connected to the bus, wherein the storage device stores program code; and
 a processor unit connected to the bus, wherein the processor unit executes the program code to request new content for a live region in a number of live regions in a webpage displayed on a display device from a server; update the live region in the number of live regions in the webpage to form an updated live region displayed on the display device in response to receiving the new content for the live region in the number of live regions in the webpage; receive an identification of a sound file associated with the updated live region in the number of live regions in the webpage and a locale of a user; retrieve the sound file associated with the updated live region in the number of live regions in the webpage from the server based on the identification of the sound file and the locale of the user, wherein the sound file is presented in different languages based on different user locales; and generate an audio cue using the sound file in a language associated with the locale of the user on a sound generation device, wherein the audio cue identifies the updated live region in the number of live regions in the webpage for which the new content has been received.

10. The computer of claim 9, wherein in executing the program code to request the new content for the live region in the number of live regions in the webpage displayed on the display device from the server, the processor unit executes the program code to receive a user input through an input device to update the live region in the number of live regions in the webpage; and request the new content for the live region in the number of live regions in the webpage displayed on the display device from the server in response to receiving the user input.

11. The computer of claim 9, wherein the processor unit further executes the program code to invoke an event handler function capable of calling an applet to generate the audio cue that identifies the updated live region in the number of live regions in the webpage for which the new content has been received.

12. The computer of claim 11, wherein the event handler function calls the applet using a call back function.

13. The computer of claim 9, wherein in executing the program code to generate the audio cue using the sound file in the language associated with the locale of the user on the sound generation device, wherein the audio cue identifies the updated live region in the number of live regions in the webpage for which the new content has been received, the processor executes the program code to initiate in response to the live region in the number of live regions being updated with the new content.

14. A computer program product stored on a computer readable storage device having program code embodied thereon that is executable by a computer for generating audio cues, the computer program product comprising:
 program code for requesting new content for a live region in a number of live regions in a webpage displayed on a display device from a server;
 program code responsive to receiving the new content for the live region in the number of live regions in the webpage, for updating the live region in the number live regions in the webpage to form an updated live region displayed on the display device;
 program code for receiving an identification of a sound file associated with the updated live region in the number of live regions in the webpage and a locale of a user;
 program code for retrieving the sound file associated with the updated live region in the number of live regions in the webpage from the server based on the identification of the sound file and the locale of the user, wherein the sound file is presented in different languages based on different user locales; and
 program code for generating an audio cue using the sound file in a language associated with the locale of the user on a sound generation device, wherein the audio cue identifies the updated live region in the number of live regions in the webpage for which the new content has been received.

15. The computer program product of claim 14, wherein the program code for requesting the new content for the live region in the number of live regions in the webpage displayed on the display device from the server comprises:
 program code for receiving a user input through an input device to update the live region in the number of live regions in the webpage; and
 program code, responsive to receiving the user input, for requesting the new content for the live region in the number of live regions in the webpage displayed on the display device from the server.

16. The computer program product of claim 14 further comprising:
 program code for invoking an event handler function capable of calling an applet to generate the audio cue that identifies the updated live region in the number of live regions in the webpage for which the new content has been received.

17. The computer program product of claim 16, wherein the event handler function calls the applet using a call back function.

18. The computer program product of claim 14, wherein the program code for generating the audio cue using the sound file in the language associated with the locale of the user on the sound generation device, wherein the audio cue identifies the updated live region in the number of live regions in the webpage for which the new content has been received, is initiated in response to the live region in the number of live regions being updated with the new content.

\* \* \* \* \*